UNITED STATES PATENT OFFICE.

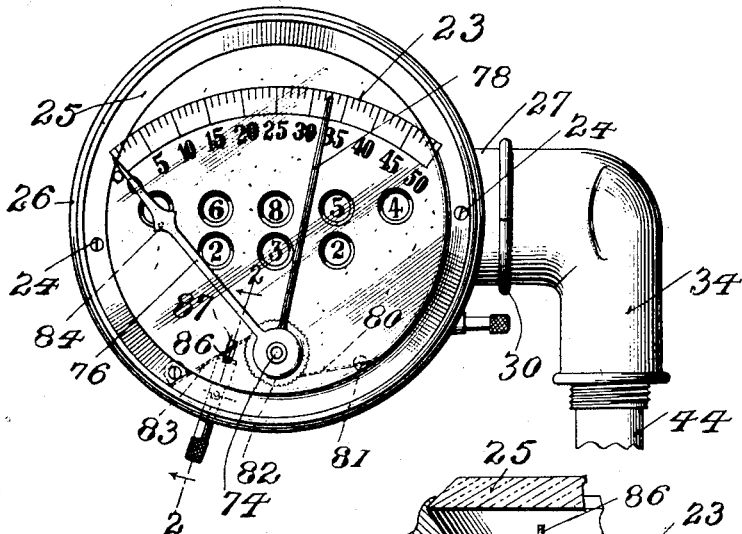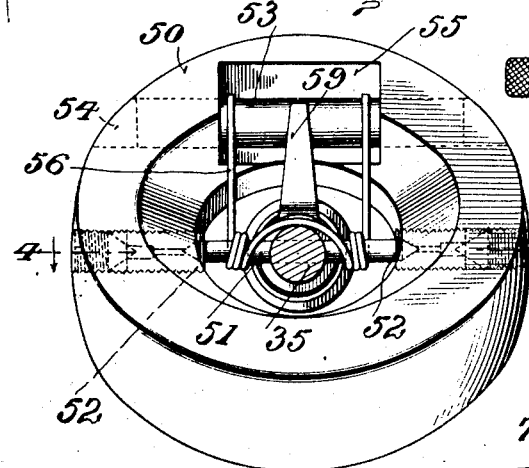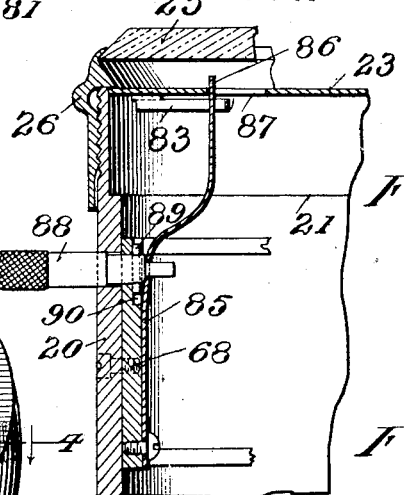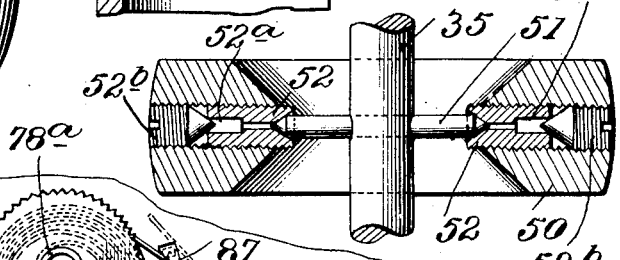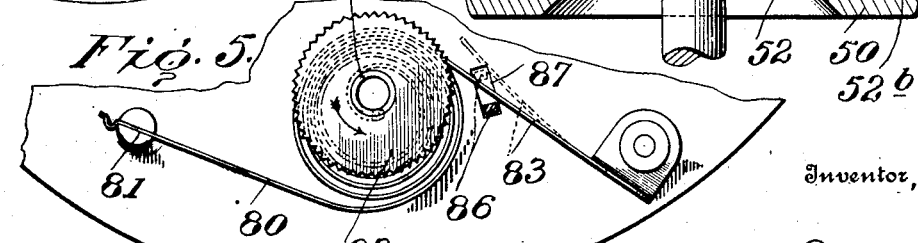

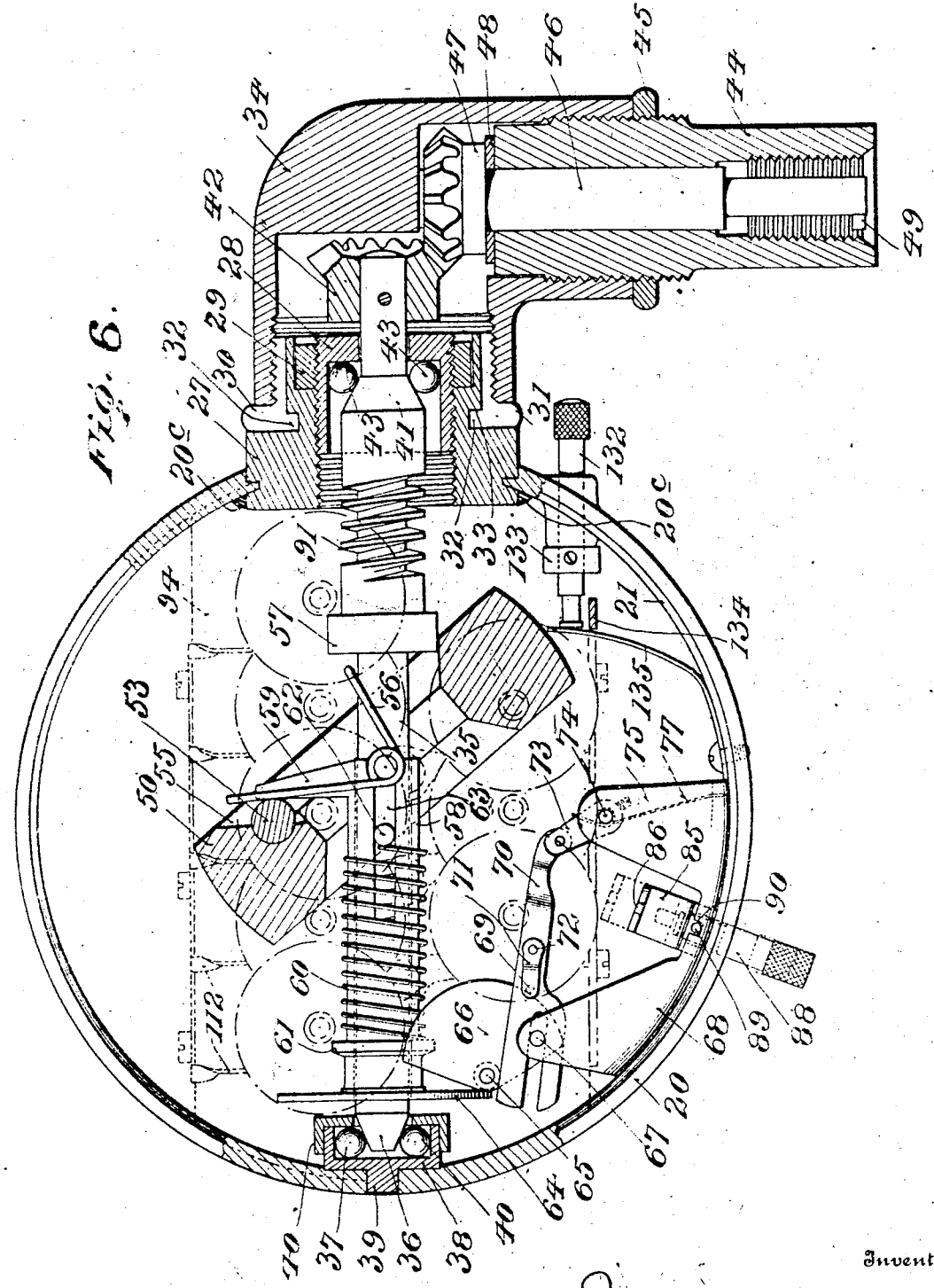

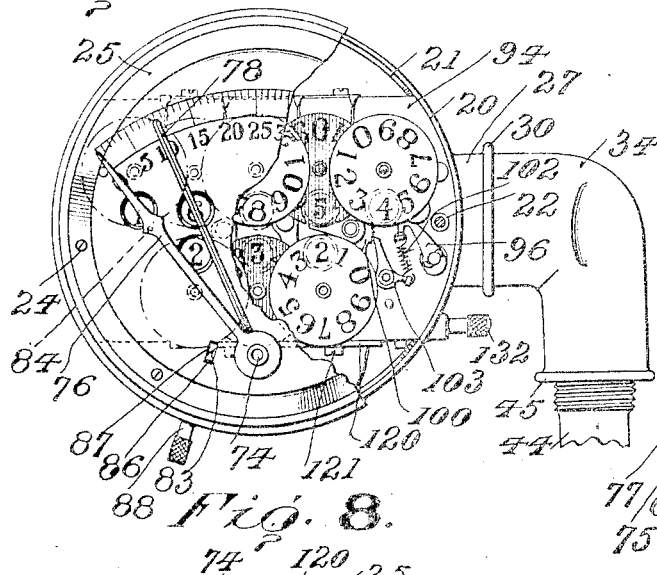

JOSEPH W. JONES, OF NEW YORK, N. Y.

SPEEDOMETER.

1,028,220.  Specification of Letters Patent.  Patented June 4, 1912.

Application filed August 7, 1908. Serial No. 447,447.

*To all whom it may concern:*

Be it known that I, JOSEPH W. JONES, of New York, N. Y., have invented new and useful Improvements in Speedometers, which invention is fully set forth in the following specification.

My invention relates to apparatus for indicating speed and distance traveled, and particularly to apparatus for use on automobiles known as "speedometer-odometers", wherein speedometer mechanism for measuring and indicating speed, and odometer mechanism for measuring and indicating distance traveled, are combined in one and the same instrument. The odometer mechanism has been made the subject-matter of a divisional application filed October 4, 1909, Serial Number 520,948.

The present invention comprises various features of improvement which can be best explained in conjunction with the accompanying drawings, illustrating what I now believe to be the preferred embodiment thereof.

Figure 1 is a face elevation of the complete apparatus; Fig. 2 is a sectional detail on the line 2—2 of Fig. 1; Fig. 3 is an elevation of the governor ring and some associated parts of the speedometer mechanism, looking from the right in Fig. 6; Fig. 4 is a section on the line 4—4 of Fig. 3; Fig. 5 is a detail view of a portion of the under side of the dial plate with associated parts; Fig. 6 is a view of the device, principally in horizontal section on the line 8—8 of Fig. 8, some of the parts being shown in elevation and others in dotted outline; Fig. 7 is a face elevation of the complete apparatus, with a part of the cover and dial plate broken away to illustrate the relative positioning of the overlapping numeral disks; Fig. 8 is an elevation of the complete device looking upward in Fig. 1 and showing in dotted outline some of the parts within the casing to illustrate the relative location of the speedometer mechanism and the odometer mechanism; Fig. 9 illustrates one method of joining to the casing the connection through which the main shaft of the mechanism extends, and to which the tubular elbow inclosing the beveled gears is joined; Fig. 10 is a detail perspective view of a frame which is attached to the inner surface of the wall of the cup casing, and parts associated therewith; and Fig. 11 is a detail perspective of a two-part ring which forms a part of the connection between the elbow and the casing.

A few words of general explanation will facilitate an understanding of the more detailed description to follow. The speedometer mechanism, located principally in the lower part of the cup-casing beneath the plate 94 which extends across the open end of the casing, includes an upright shaft or spindle 74 which is rotated to move an index hand or pointer 76 over a graduated dial on the dial plate 23, the position of this index hand with reference to the figures on the dial indicating the speed being measured. A maximum hand 78 is provided adapted to be retained in position to indicate the highest speed attained. The odometer mechanism, mounted principally upon the plate 94, is geared to and driven from the main or governor shaft 35 of the speedometer mechanism, and includes two series of numeral disks; the upper series, shown in the drawings (Fig. 7, and dotted lines Fig. 6) as comprising five disks, is driven to indicate the number of miles traveled by a motor vehicle, say for example, during an extended period, or covering a numer of trips. One number on each of these five numeral disks is displayed through a correspondingly positioned one of an upper series of five display openings through the dial plate. The lower series of numeral disks comprises, as shown in the drawings, three disks intended to indicate the number of miles traveled during a limited period, or say, during a single trip. Means are provided for readily returning these three disks to their zero position without interfering with the positions of the five disks of the upper series. One numeral on each of the three disks in the lower series is displayed through a corresponding one of three display openings through the dial plate.

Coming now to a detailed description, 20 is a circular cup-like inclosing casing having an offset or shoulder 21 extending entirely around the inner surface of its wall just below the open end of the casing. The plate 94, heretofore mentioned, rests at its opposite ends on this shoulder and is firmly secured to the casing by suitably placed screws, not shown.

22, 22, are short posts at opposite ends of plate 94 for supporting the circular dial plate 23, screws 24, 24, passing through the said dial plate into screw-threaded openings in said posts.

25 is a glass cover having a beveled edge and secured in an annular frame 26, which latter has an interior screw thread adapted to engage an exterior thread about the open end of the casing.

In an opening through one side of the casing, there is secured a tubular connection 27 which is interiorly screw threaded for engagement with the exterior thread on a ball-cup 28. An improved and economical way of securing connection 27 to the casing is illustrated particularly in Fig. 9; 27$^a$, 27$^a$ are two projecting lips on connection 27, adapted to pass into the spaces 20$^a$ 20$^a$ between the ends of inwardly projecting lips 20$^b$, 20$^b$ of an opening through the side wall of the cup-casing, whereby when connection 27 is given a quarter of a rotation the lips 27$^a$ will engage behind and bear upon the lips 20$^b$, 20$^b$. Solder 20$^c$ (Fig. 6) is then preferably applied to prevent further relative rotation and the parts are thus securely and neatly locked together by what may be designated a bayonet-joint, or an interrupted screw-thread or breech-block connection. It will of course be understood that the contacting surfaces of the lips may one or both be inclined to have a cam action, so that the turning of the part 27 in the opening draws it firmly to its seat. Said cup is locked in any position to which it is adjusted by a nut 29 engaging an exterior thread thereon and adapted to be seated against the bottom of an annular recess in the outer end of the connection 27. The parts 30, 31, of a two-part ring (see Fig. 11) each have an inwardly projecting lip or flange 32 engaging a groove 33 (Fig. 6) which extends completely around the outer wall of the connection 27. Exterior screw threads on the parts of the two-part ring register at their ends when the parts of the ring are relatively positioned about the outer end of the connection 27, thereby permitting the interiorly screw threaded end of an elbow 34 to be screwed on to the two-part ring, holding the parts thereof together with their flanges 32 in locking engagement with the grooves 33. With the elbow turned down firmly against the main portion of the two-part ring the elbow is joined to the part 27, and the casing, by a swivel, which permits the elbow to be turned without disturbing the relative positioning and arrangement of the parts. The advantage of this connection will be apparent; with the elbow or other part joined to the casing simply by a screw thread connection, as has been customary heretofore, turning of the elbow caused the screw thread connection to move the elbow farther toward or away from the casing. With a beveled gear shaft connection, such as herein illustrated, this interferes with the meshing of the gears. Other apparent advantages of the connection need not be herein detailed.

35 is the main or governor shaft of the device, coned or tapered at one end at 36 for engagement with anti-friction balls 37 inclosed in a circular ball-cup 38 (Fig. 6); a stud 39 centrally positioned on the bottom of the cup is driven into a recess in the inner wall of the casing 20. A cap 40 fitting closely over the open end of the ball-cup with frictional engagement, retains the balls in place and is provided with a central opening through which the conical end of the shaft projects. It will thus be seen that at its left hand end, Fig. 6, the main shaft 35 is supported or journaled in a ball bearing. At its right hand end the shaft 35 has a tapered or frusto-conical shoulder 41, the smaller end of the shaft beyond this shoulder extending through a central opening in the ball cup 28 and carrying a beveled gear 42 rotating in a chamber within the elbow 34. The conical shoulder 41 engages balls 43 within the cup 28, thereby forming a ball bearing for the right hand end of the shaft, Fig. 6.

44 is a tubular plug having a screw thread on its exterior adapted to engage an interior thread at the outer end of the elbow 34; a ring lock nut 45 secures the parts against turning when brought to proper relative position. A short shaft 46 rotatably mounted in the plug 44 carries fixed to its inner end, preferably formed integral therewith, a beveled gear 47 adapted to mesh with the beveled gear 42 heretofore mentioned.

48 is a washer interposed between the beveled gear 47 and the inner end of the plug 44.

The outer reduced end of the shaft 46 is formed with a laterally projecting lug 49, preferably formed integral with the shaft in reducing its end, and the end of the plug 44 is interiorly screw threaded, these provisions being made for effecting connection with a flexible shaft and its inclosing sheathing in a manner, which need not be described in detail herein. The flexible shaft is, in the case of a motor vehicle, intended to extend to the gearing connections whereby it is to be rotated from one of the wheels of the vehicle.

I will now describe parts of the device relating more particularly to the speedometer mechanism, which latter embodies the general features of my Patent No. 765,841, of July 26th, 1904, with the addition of features of improvements embraced by the present invention.

The annular centrifugal governor weight or ring 50 is adapted, during its rotation with the shaft, to swing (with variations in the speed of rotation of the shaft) on an axis transverse to the axis of the shaft, as in my patent heretofore mentioned. In the present construction, which differs in this respect from that of the patent, a short pin or stud 51 passes through a transverse opening in the shaft 35 and has at opposite ends conical points engaging conical bearing recesses in the inner ends of pins 52, 52, respectively. Said pins are in screw threaded engagement with oppositely disposed screw-threaded openings extending diametrically through opposite sides of the centrifugal weight 50. Each pin 52 is split at its outer end at 52$^a$ and is adapted to be spread by the inner conical end of a screw 52$^b$ to clamp the parts in their adjusted positions. A cylindrical pin 53 driven into an opening 54 through the governor ring 50, parallel to the axis on which the latter swings, extends across a recessed or cut-away portion 55 of the weight, and provides in this space a cylindrical surface against which the opposite ends of a saddle spring 56 bear, said spring tending to constantly hold the weight in the position illustrated in Fig. 6, the movement of the weight under this influence of the spring being limited by contact of the ring with a circular enlargement 57 on shaft 35; this spring also acts in opposition to centrifugal force which during rotation of the shaft 35 and the governor ring tends to cause the latter to assume a position at right angles to the axis of the shaft. As clearly shown in Figs. 3 and 6, the spring makes several turns around the pin 51 at each side of the shaft 35; the portion of the spring between the innermost turns bridges across and bears upon the shaft.

58 is a sleeve embracing shaft 35 and adapted to be moved longitudinally thereon by the action of the governor ring, a laterally extending preferably integral arm 59 on the sleeve making contact with the cylindrical surface formed by the pin 53. A coiled spring 60 embraces the sleeve and bears at one end against a circular flange or collar 61, preferably formed integral with the sleeve, and at its other end against the projecting ends of a pin 62 extending transversely through the shaft 35; through this arrangement the spring 60 exerts its tension to keep the arm 59 constantly in engagement with the cylindrical surface formed by the pin 53. Elongated slots 63 are provided in opposite sides of the sleeve 58, which slots embrace projecting ends of the pins 51 and 62, so that the latter do not interfere with the longitudinal movement of the sleeve. At the extreme left hand end of Fig. 8, the sleeve 60 is provided with a circular flange or disk 64, preferably formed integral with the sleeve, which flange engages a rounded head on a pin 65 depending from the under side of a plate 66, which latter is secured to a shaft 67 (Figs. 6 and 10) rotatably journaled at its opposite ends in bracket arms extending inwardly within the casing from a frame 68 secured to the inner surface of the casing. The cam-shaped edge of cam plate 66 is calibrated in the manner set forth in my patent above enumerated, and bears against a pin 69 projecting through an opening in a longitudinally movable connecting bar or link 70. A small plate 71, pivoted at 72 to said bar, and at its other end turned to position over the head of pin 69, permits said pin to be removed during the calibration operation above mentioned. At one end the connecting bar 70 lies above the plate 66 and is forked or slotted to embrace the shaft 67. At its other end bar 70 is pivoted to an arm 73 secured to a shaft 74 journaled in openings in bracket arms 75 of frame 68, said shaft extending upward through the dial plate 23, and carrying the index hand or pointer 76. A fine wire spring 77 anchored at its outer end in a notch in the frame 68 is coiled about the shaft 74, and at its other end anchored to the arm 73, and acts through the arm 73 and the bar 70 to always hold the pin 69 in engagement with the actuating edge of the plate 66 and also to constantly hold the head of pin 65 in contact with disk 64.

It will be readily understood that the speedometer mechanism described will cause the hand 76 to assume a position with relation to the dial corresponding with the speed at which the shaft 35 is being driven at that particular instant.

In order to indicate the maximum speed, that at which the motor vehicle has been driven for example, I provide what is known as a maximum-hand, which in the drawings is illustrated at 78, this hand being secured to the projecting end of a short tubular shaft 78$^a$ (Fig. 5) which passes through the dial plate concentric to the shaft 74. Beneath the dial plate this shaft is provided with a drum-like portion on which a fine flat spring 80 is wound, said spring being anchored at one end to a pin 81 on the under side of the dial plate, and at its other end to said drum-like portion, whereby movement of the maximum-hand toward the right in Fig. 1 causes said spring to be wound upon the shaft. At its inner end shaft 78$^a$ carries a disk 82 having cut in its peripheral edge a succession of very fine teeth adapted to be engaged by the end of a retaining spring or pawl 83 rigidly secured at one end of the under side of the dial plate, as clearly shown in Fig. 5. This retaining spring or pawl 83 thus retains the maximum-hand in its position of farthest advance over the scale on the dial plate, and in doing so resists the tension of the spring 80 which is constantly exerted in an effort to return said maximum-hand to the position of the pointer 76, and in contact with the pin or lug 84 on the hand 76 which depends into the path of the maximum-hand and acts upon the latter to advance it with the hand 76.

85 is a spring blade secured at its lower end by a screw 85ª (Figs. 2 and 10) to the frame 68. Near its upper end this spring is bent toward the center of the casing; it has a reduced extremity 86 working in a slot 87 in the dial plate and adapted to engage the spring pawl 83 at a point just under the dial plate. Movement of the upper end of the spring from the position shown in full lines in Fig. 5 to that shown in dotted lines in the same figure will bend back the end of the spring pawl 83 freeing it from engagement with the toothed edge of the disk 82, thereby releasing the maximum-hand to the action of spring 80, which latter thereupon returns said hand to the position occupied by the index hand at that particular instant. To actuate the spring 85 to this end, I provide a plunger 88 (having a milled head exterior of the casing) passing through an opening in the wall of the casing, an inner reduced end of this plunger passing into a somewhat larger opening in the spring 85. This spring constantly tends to hold the plunger out; inward pressure on the plunger overcoming the tension of the spring releases the maximum-hand in the manner already described. A pin 89 extending transversely through the stem of the plunger within the casing prevents the plunger from being withdrawn. When the parts are in the position shown in full lines in Fig. 2, the maximum-hand is operative to indicate maximum speed, the pin 89 being in a position longitudinal to and lying in a groove 90, leaving the spring pawl 83 in position to engage the teeth of the disk 82. It sometimes becomes desirable, however, to throw the maximum-hand out of operation, under which conditions it constantly follows the movement of the indicating-hand. This is effected by pushing the plunger 88 inward and rotating it a quarter of a turn to cause the pin 89 to assume a position across the groove 90, thus continuously retaining the spring 85 in such position as to hold the spring pawl 83 disengaged from the disk 82.

What I claim is:—

1. The combination of a main or governor shaft, of a governor or centrifugal weight in the form of a ring through the center of which the shaft passes; weight-supporting and pivoting projections radiating in opposite directions from the shaft; and two exteriorly screw-threaded plugs engaging interiorly screw-threaded oppositely disposed openings respectively in the governor weight, the inner ends of said plugs engaging the outer ends of the pivoting projections, thereby pivoting the governor weight to swing to different angular positions transverse to the main shaft.

2. The combination of a main or governor shaft, of a governor or centrifugal weight in the form of a ring through the center of which the shaft passes; weight-supporting and pivoting projections radiating in opposite directions from the shaft; and a screw in each of the oppositely disposed screw-threaded openings, the inner end of each of said screws being tapered to engage and spread the outer end of the corresponding plug to securely retain the latter in its adjusted position.

3. The combination of a main or governor shaft, of a governor or centrifugal weight in the form of a ring through the center of which the shaft passes; means supporting said weight from the shaft to rotate with the shaft but to swing to different angular positions transverse thereof; a sleeve movable longitudinally on said shaft but rotatable therewith; an arm projecting rigidly from said sleeve into the path of the swinging movement of the weight whereby the weight in swinging to or toward a position at right-angles to the axis of the main shaft moves the sleeve longitudinally on the shaft; and spring means opposing such movement of the governor weight and sleeve.

4. The combination of a main or governor shaft, of a governor or centrifugal weight in the form of a ring through the center of which the shaft passes; said governor weight having a cylindrical bearing surface approximately parallel to the axis on which the weight swings; means supporting said weight from the shaft to rotate with the shaft but to swing to different angular positions transverse thereof; a sleeve movable longitudinally on said shaft but rotatable therewith; an arm projecting rigidly from said sleeve into contact with said cylindrical bearing surface, whereby the weight in swinging to or toward a position at right-angles to the axis of the main shaft moves the sleeve longitudinally on the shaft; and spring means opposing such movement of the governor weight and sleeve.

In testimony whereof I have signed this specification in the presence of two subscribing witnesses.

JOSEPH W. JONES.

Witnesses:
ARTHUR NICHOLS,
ALBERT FORTGTUG.